US006854766B2

(12) United States Patent
Kobayashi

(10) Patent No.: US 6,854,766 B2
(45) Date of Patent: Feb. 15, 2005

(54) STORAGE CONSTRUCTION FOR SEAT BELT CONNECTING MEMBER IN SEAT BELT SYSTEM

(75) Inventor: Akira Kobayashi, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 26 days.

(21) Appl. No.: 10/385,905

(22) Filed: Mar. 11, 2003

(65) Prior Publication Data

US 2003/0173767 A1 Sep. 18, 2003

(30) Foreign Application Priority Data

Mar. 18, 2002 (JP) ........................................ 2002-073686

(51) Int. Cl.⁷ ............................................. B60R 22/00
(52) U.S. Cl. ..................... 280/801.1; 297/481; 297/482
(58) Field of Search ............................. 280/801.1, 802; 297/481, 482, 483

(56) References Cited

U.S. PATENT DOCUMENTS

| | | | | | |
|---|---|---|---|---|---|
| 4,548,425 | A | * | 10/1985 | Evans | 280/808 |
| 5,957,499 | A | * | 9/1999 | Kempf | 280/801.1 |
| 6,234,529 | B1 | * | 5/2001 | Ellison et al. | 280/808 |
| 6,334,628 | B1 | * | 1/2002 | Newball et al. | 280/801.1 |
| 6,412,876 | B2 | * | 7/2002 | Nishide | 297/482 |

FOREIGN PATENT DOCUMENTS

| | | |
|---|---|---|
| DE | 100 14 889 A1 | 9/2001 |
| EP | 0 769 432 A1 | 4/1997 |
| FR | 2 701 906 | 9/1994 |

* cited by examiner

Primary Examiner—Paul N. Dickson
Assistant Examiner—Toan C To
(74) Attorney, Agent, or Firm—Alston & Bird LLP

(57) ABSTRACT

There is provided a storage construction for a seat belt connecting member in a seat belt system in which a seat belt pulled out of a retractor provided on a vehicle body is pulled out in a slantwise downward direction via a sash guide mounted in a roof portion, a first connecting member mounted at the tip end of the seat belt is fixed to a first fixing member provided on the seat side, and a second connecting member provided in an intermediate portion of the seat belt is fixed to a second fixing member provided on the seat side, whereby a seat belt user is restrained by the seat belt set at three points. A connecting member attaching cover 12 is provided in a sash guide attaching portion in the roof portion 4, and the connecting member attaching cover 12 is provided with holding means 18 and 15 for holding the first and second connecting members 7 and 10 separately when the seat belt is not in use. Thereby, the seat belt connecting member can be stored without changing the seat belt system when the seat belt is not in use.

11 Claims, 11 Drawing Sheets

STORAGE CONSTRUCTION FOR SEAT BELT CONNECTING MEMBER IN SEAT BELT SYSTEM

FIELD OF THE INVENTION AND RELATED ART STATEMENT

The present invention relates to a three point seat belt which is mainly used for a center seat of a motor vehicle, and also relates to a storage construction for a seat belt connecting member in a seat belt system in which the seat belt connecting member can be held in a vehicle body roof portion when it is not in use.

Generally, a front seat and a rear seat of a motor vehicle are equipped mainly with a three point seat belt system to restrain a passenger in a seat.

The seat belt system of this type is constructed as described below. As shown in FIG. 15, one end of a seat belt system (seat belt) 100 is fixed to an anchor plate 101, and the other end thereof is held by a retractor (take-up device) 104 provided at the lower end part of a center pillar 103 through a through ring (referred also to as a sash guide) 102. A through tang 105 provided in an intermediate portion of the seat belt 100 between the anchor plate 101 and the through ring 102 is engaged with a buckle 106 erectly provided in a vehicle body central portion. Thereby, a passenger is restrained in a seat.

On the other hand, for a three-passenger seat, a through ring of seat belt anchor is installed to a roof portion to apply the three point seat belt system to a center seat.

FIGS. 16 and 17 show a three point seat belt system that has conventionally been used for a center seat. For this seat belt system, a retractor 110 is mounted in a rear pillar portion 109 composed of a side body outer panel 107 and an inner panel 108. A seat belt 111 pulled out of the retractor 110 is pulled out in a slantwise downward direction through a through ring (referred also to as a sash guide) 113 installed to a roof portion 112. A connector 114 is mounted at the tip end of the seat belt 111 as a first connecting member, and a tang 115 is mounted at an intermediate position of the seat belt 111 as a second connecting member. On both sides of the center seat of a seat 116, a first fixing member 117 for fixing the connector 114 and a second fixing member 118 for fixing the tang 115 are provided. The connector 114 is fixed to the fixing member 117, and the tang 115 is fixed to the fixing member 118 to use the seat belt system.

When the seat belt system is not in use, upon disconnecting the connector 114 from the fixing member 117 and the tang 115 from the fixing member 118, the seat belt 111 is rewound by the retractor 110, and becomes in a state of hanging down from the through ring 113. In this state, the connector 114 and the tang 115 sway when the vehicle is in motion, which obstructs the rear view.

To overcome this problem, as shown in FIG. 18, a support 121 is fixed on the lower surface of a roof lining 120 with a bolt 119 for installing the through ring 113 to the roof portion, a magnet 122 is installed to the support 121, and the connector 114 is held by the magnet 122. At this time, the tang 115 is arranged on a plate 123 installed to the seat belt 111, and is stored on the lower surface side of the roof lining 120.

Also, as shown in FIGS. 19 and 20, a pocket portion 124 formed double is provided on the seat belt 111 at a position close to the connector 114. The tang 115 is inserted and fixed in the pocket portion 124, and the connector 114 is installed to the magnet 122 provided on the lower surface of the roof lining 120, by which the seat belt connecting members are stored.

OBJECT AND SUMMARY OF THE INVENTION

The present invention has been made to solve the above problems, and accordingly an object thereof is to provide a storage construction for a seat belt connecting member in a seat belt system, which can store the seat belt connecting member without changing the seat belt system when a seat belt is not in use.

To attain the above object, the present invention provides a storage construction for a seat belt connecting member in a seat belt system in which a seat belt pulled out of a retractor provided on a vehicle body is pulled out in a slantwise downward direction via a sash guide mounted in a roof portion, a first connecting member mounted at the tip end of the seat belt is fixed to a first fixing member provided on the seat side, and a second connecting member provided in an intermediate portion of the seat belt is fixed to a second fixing member provided on the seat side, whereby a seat belt user is restrained by the seat belt set at three points, wherein a connecting member attaching cover is provided in a sash guide attaching portion in the roof portion, and the connecting member attaching cover is provided with holding means for holding the first and second connecting members separately when the seat belt is not in use.

Also, in the present invention, a concave portion is provided on the lower surface side of the attaching cover, and holding means for holding the first and second connecting members separately when the seat belt is not in use is provided in the concave portion.

Further, in the present invention, holding means for holding the second connecting member by means of a magnetic force is provided in the concave portion of the attaching cover, and a holder which engages with the first connecting member to hold the first connecting member is provided in a side wall portion of the concave portion of the attaching cover.

Still further, in the present invention, a magnet is used as the holding means for holding the second connecting member by means of a magnetic force, and the magnet is assembled and fixed to a magnet attaching seat molded integrally with the attaching cover.

Also, in the present invention, holding means which holds the second connecting member by holding the same between a pair of claw portions is provided in the concave portion of the attaching cover, and a connecting member holder which engages with the first connecting member to hold the first connecting member is provided in a side wall portion of the concave portion of the attaching cover.

Further, in the present invention, an opening for inserting the first connecting member is formed in a side wall surface of the concave portion of the attaching cover as the connecting member holder, a holder chamber having a locking portion for hooking an engagement portion of the first connecting member is provided on the outside of the opening, and the holder chamber is formed so that the chamber width thereof is wider than the width of the first connecting member, but is narrower than the width of the first connecting member at the position of the locking portion.

Still further, in the present invention, a space for allowing the first connecting member to pass through is provided above the locking portion, and the holder chamber is formed so that the upper end position of the locking portion is lower than the upper end of the opening.

Also, in the present invention, an opening for inserting the first connecting member is formed in a side wall surface of the concave portion of the attaching cover as the connecting member holder, a holding chamber is provided on the outside of the opening, and a movable element having a locking portion for hooking the engagement portion of the first connecting member is provided in the holder chamber.

Further, in the present invention, an opening is formed in a roof lining of the roof portion, a plurality of claw portions which engage with the edge of the opening of the roof lining are formed at least on one side of the attaching cover and a clip attaching portion is formed on the other side of the attaching cover, and the claw portions are engaged with the edge of the opening of the roof lining and a clip mounted on the clip attaching portion is hooked to the roof lining, whereby the attaching cover is mounted in the roof portion.

DETAILED DESCRIPTION OF PREFERRED EMBODIMENTS

Embodiments of a storage construction for a seat belt connecting member in a seat belt system in accordance with the present invention will now be described in detail with reference to the accompanying drawings.

Figure 1:
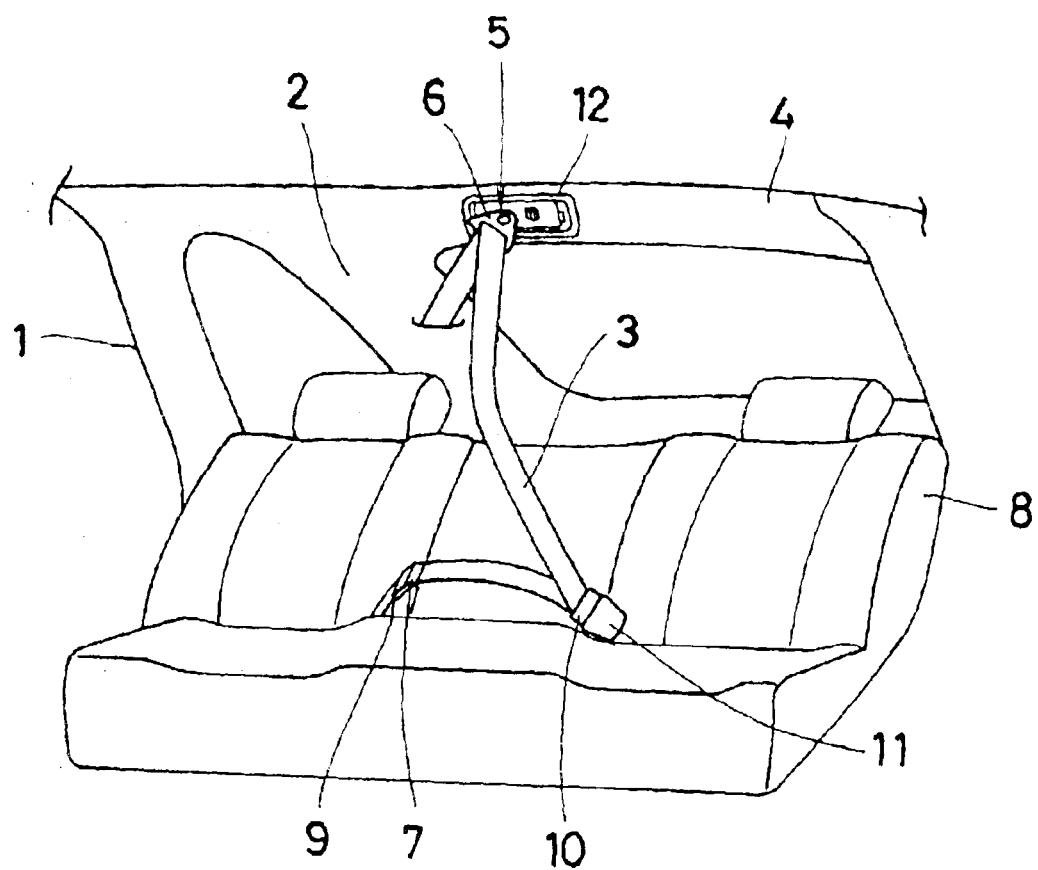
FIG. 1 is a schematic view showing an embodiment of a storage construction for a seat belt connecting member in a seat belt system in accordance with the present invention.
Figure 2:
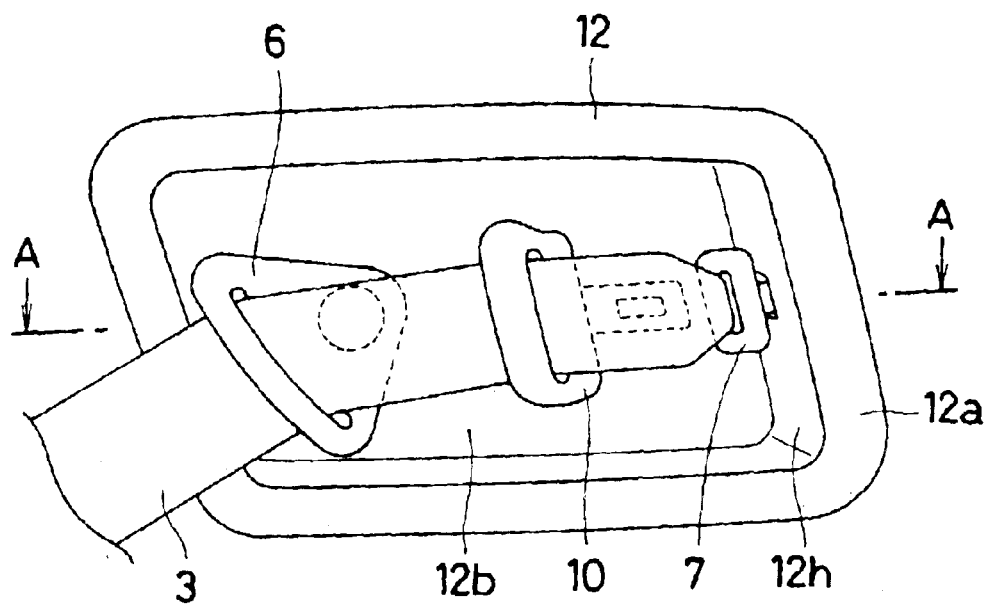
FIG. 2 is a perspective view showing a storage construction for a seat belt connecting member in a seat belt system in accordance with the present invention.

FIG. 1 shows a storage construction for a seat belt connecting member in a seat belt system, which is applied to a rear seat of a motor vehicle using a three point seat belt system on a center seat.

When the seat belt system is used, a seat belt 3 which is pulled out of a retractor (not shown) mounted in a rear pillar portion 2 of a vehicle body 1 is guided in a slantwise downward direction through a sash guide (also referred to as a through ring) 6 of a seat belt anchor 5 installed to a roof portion 4. A connector 7, which serves as a first connecting member, mounted at the tip end of the seat belt 3 is engaged with a first fixing member 9 mounted on one side of the center seat of a rear seat 8, and a tang (referred also to as a through tang) 10, which serves as a second connecting member, mounted in an intermediate portion of the seat belt 3 is engaged with a second fixing member 11 mounted on the other side of the center seat of the rear seat 8.

FIGS. 2 to 8 show a storage construction for the seat belt connecting member at the time when the seat belt system is not in use.

In the roof portion 4 to which the sash guide 6 of the seat belt anchor 5 is installed, a connecting member attaching cover 12 (hereinafter referred simply to as an attaching cover 12) is mounted.

Figure 3:
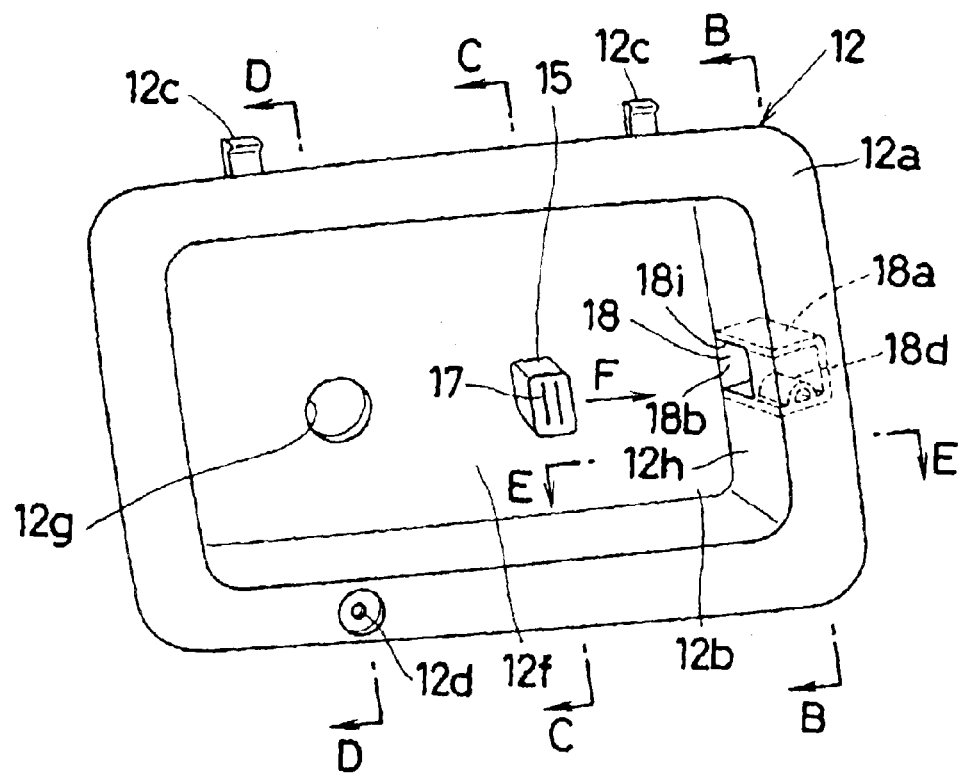
FIG. 3 is a perspective view showing a cover for installing the connecting member shown in FIG. 2.

As shown in FIG. 3, the attaching cover 12 is formed by resin molding, provided with a flange portion 12*a* around the same, and is formed with a square concave portion 12*b* on the inside. On the back side of one side of the flange portion 12*a* disposed to the front side of the vehicle body, a plurality of claw portions 12*c* that extend so as to be opposed to the flange portion 12*a* are integrally molded. The flange portion 12*a* on the opposite side to the claw portions 12*c* is formed with a clip hole 12*d*. The front and rear portions of the attaching cover 12 are fixed to the roof portion 4 via a clip 13 mounted in the clip hole 12*d* and the claw portions 12*c* (see FIG. 7).

Figure 5:
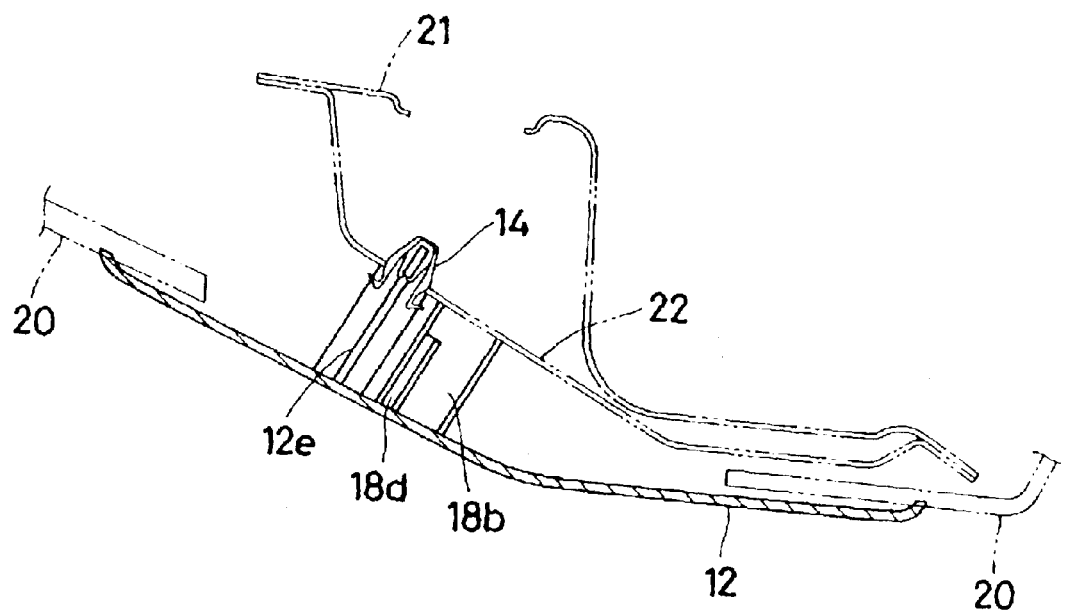
FIG. 5 is a sectional view taken along the line B—B of FIG. 3.
Figure 8:
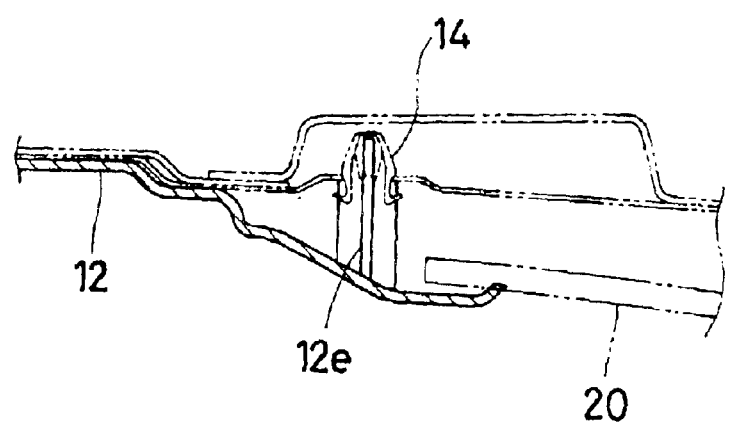
FIG. 8 is a sectional view taken along the line E—E of FIG. 3.

The attaching cover 12 is assembled to the front side of an opening 20*a* in a roof lining 20 so as to hold the roof lining 20 between the flange portion 12*a* and the claw portion 12*c* by inserting the claw portions 12*c* extending so as to be opposed to the flange portion 12*a* into the inside of the opening 20*a* of the roof lining 20. Also, the attaching cover 12 is assembled to the rear side of the opening 20*a* of the roof lining 20 by the clip 13 mounted in the clip hole 12*d* formed in the opposite side to flange portion 12*a*. As shown in FIGS. 5 and 8, on the back face of the right-and-left side flange portion 12*a* disposed in the vehicle width direction of the attaching cover 12, a clip seat 12*e* is provided at a substantially middle position of the flange portion 12*a*, and both side portions of the attaching cover 12 are fixed to the roof portion 4 via a clip 14 mounted on the clip seat 12*e* (see FIG. 8). The clip 14 mounted on the clip seat 12*e* is inserted in an attaching hole (not shown) formed in the later-described roof back inner lower member 22 and is assembled.

The attaching cover 12 has a bolt hole 12*g* formed in an internal surface 12*f* of the concave portion 12*b* to attach the sash guide 6 of the seat belt anchor 5, and also has a holding means 15 provided in line with the bolt hole 12g in the vehicle width direction to hold the tang 10.

Figure 4:
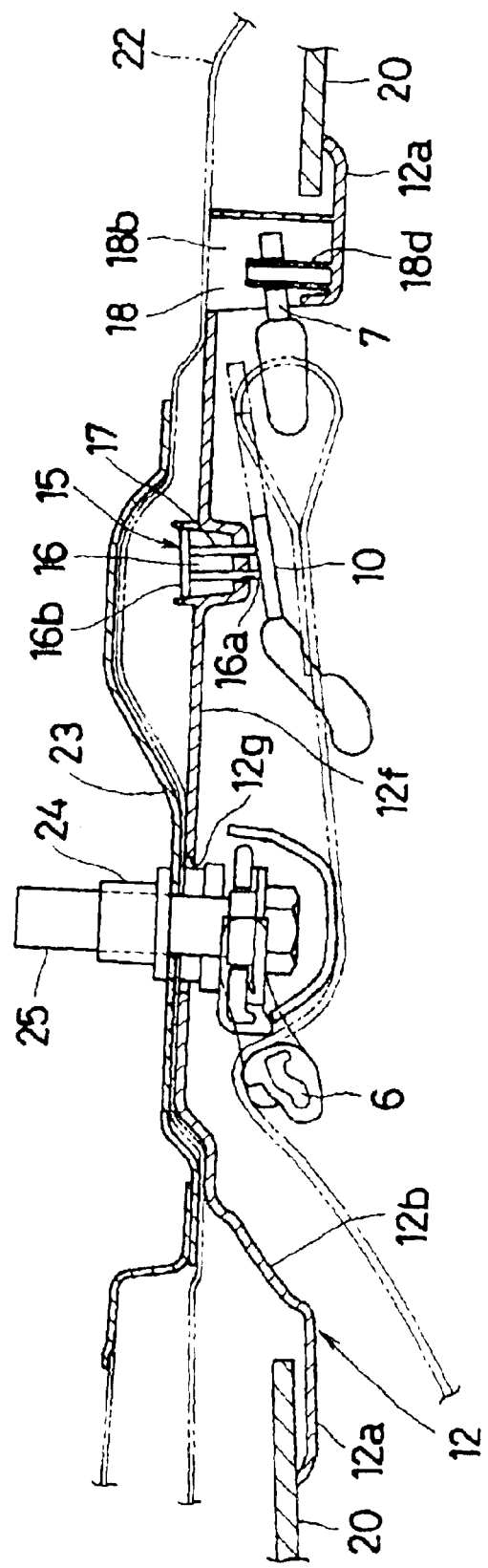
FIG. 4 is a sectional view taken along the line A—A of FIG. 2.
Figure 6:
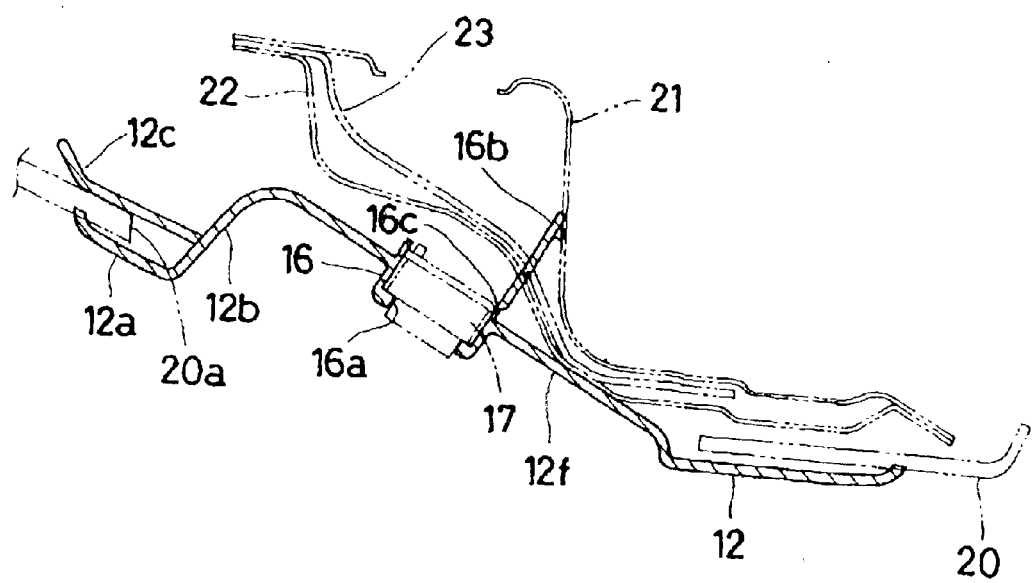
FIG. 6 is a sectional view taken along the line C—C of FIG. 3.
Figure 7:
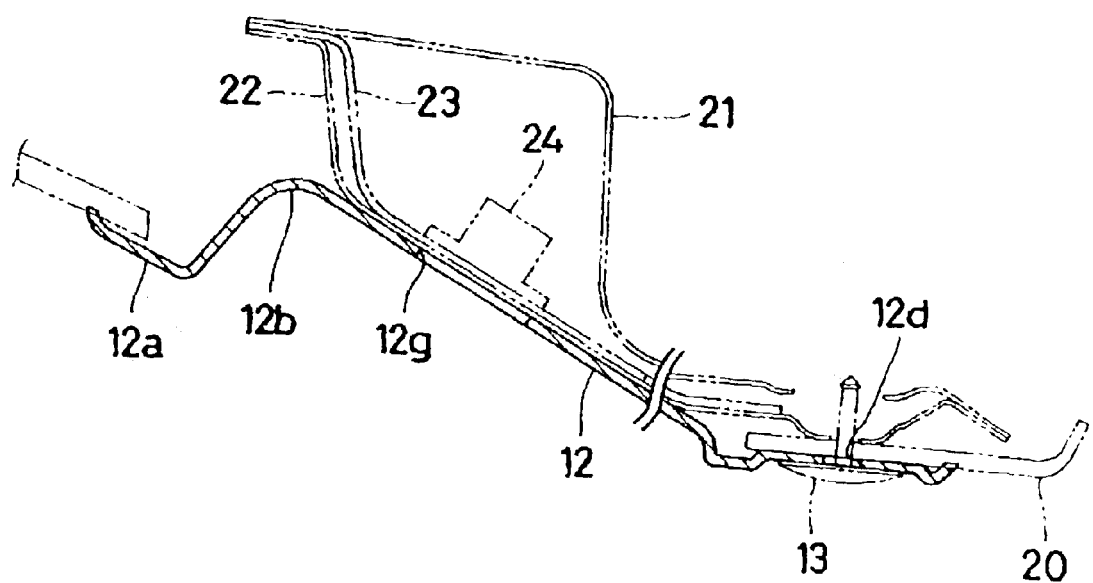
FIG. 7 is a sectional view taken along the line D—D of FIG. 3.
Figure 9:
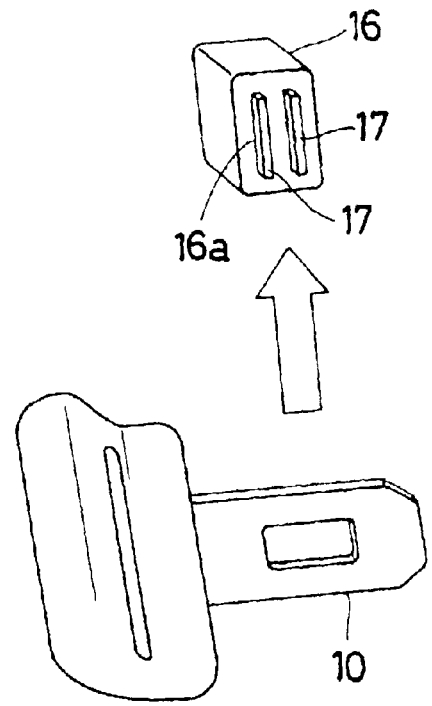
FIG. 9 is a schematic perspective view showing holding means for holding a tang of a seat belt connecting member.
Figure 10:
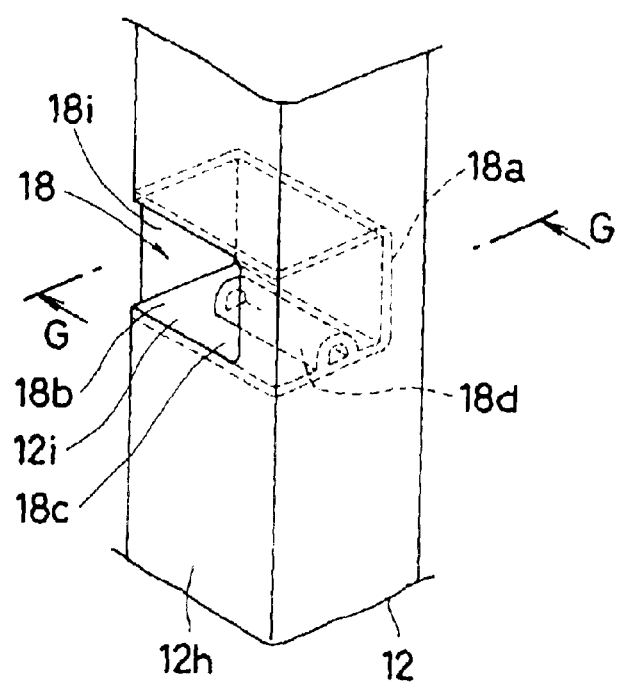
FIG. 10 is a perspective view taken in the direction of the arrow F of FIG. 3, showing a connector holder.

As shown in FIGS. 4 and 6, the holding means 15 incorporates magnets 17 such as permanent magnets in a storage chamber 16 molded integrally with the internal surface 12f of the concave portion 12b of the attaching cover 12. The storage chamber 16 is formed with slits 16a in the bottom surface of a space portion, and the plate-shaped magnet 17 protrudes from the slit 16a (see FIG. 9). By closing a cover 16b provided on the storage chamber 16, the magnets 17 are fixed. The cover 16b is connected to the storage chamber 16 by a thin-wall portion 16c.

At a position in line with the bolt hole 12g and the holding means 15 of the attaching cover 12 in the vehicle width direction on the lower surface of the flange portion 12a, a connector holder (connecting member holder) 18 is provided to hold a connector 7.

As shown in FIGS. 3, and 10 to 12, the connector holder 18 has a holder chamber 18b surrounded by a wall surface 18a. The holder chamber 18b is formed on the outside of an opening 12i, which serves as an insertion port, formed in a side wall 12h of the concave portion 12b of the attaching cover 12. On an internal wall surface 18c of the holder chamber 18b, a columnar protrusion 18d is formed as a locking portion for hooking a hook-shaped engagement portion 7a of the connector 7. The protrusion 18d is formed so that a height h1 thereof is smaller than a height h2 of an opening 18i, and a space portion 19 is formed above the protrusion 18d to allow the connector 7 to pass through.

Figure 11:
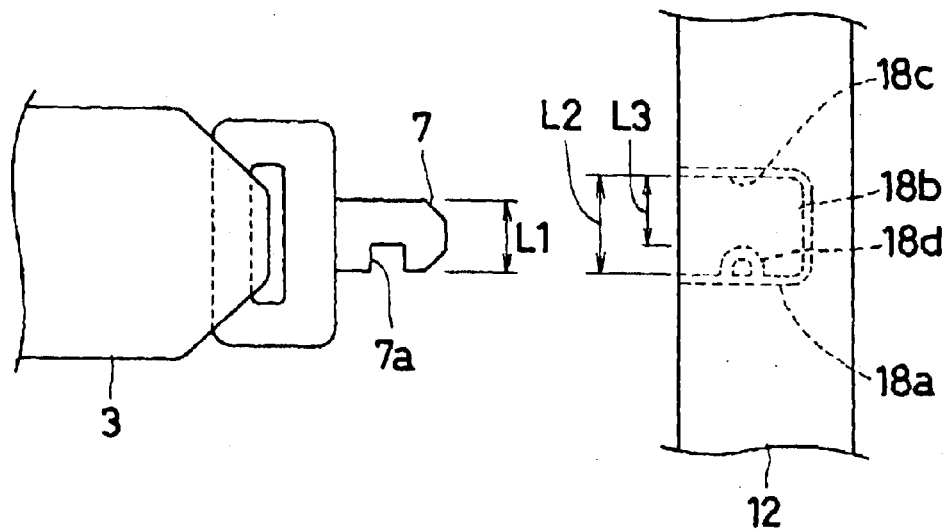
FIG. 11 is a schematic view showing the relationship between the connector holder shown in FIG. 10 and a connector.
Figure 12:
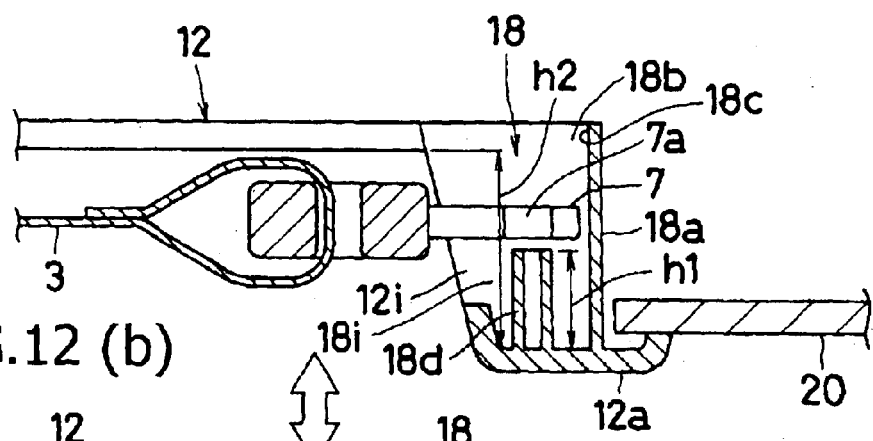
FIG. 12 is sectional view taken along the line G—G of FIG. 10, FIG. 12(*a*) being a sectional view showing a state before a connector is engaged, and FIG. 12(*b*) being a sectional view showing a state in which a connector is engaged.
Figure 12:
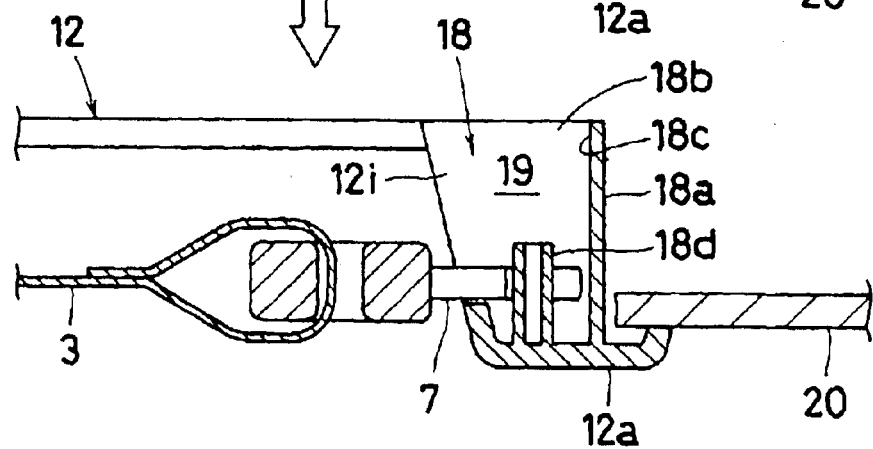

As shown in FIG. 11, the holder chamber 18b is formed so that a chamber width L2 is wider than a width L1 of the connector 7 (L2>L1) and a width L3 at the position of the protrusion 18d serving as a locking portion is narrower than the width L1 of the connector 7 (L3<L1).

The attaching cover 12 is installed to the roof portion 4 so as to close the opening 20a formed in the roof lining of the roof portion 4.

The roof portion 4 is reinforced by providing a rear seat belt reinforcement 23 between a roof back inner upper member 21 and the roof back inner lower member 22, and the seat belt anchor 5 is attached to a joint portion between the roof back inner lower member 22 and the rear seat belt reinforcement 23. The seat belt anchor 5 is fixed by fastening a bolt 25 to a nut 24 fixed by welding to the rear seat belt reinforcement 23 from the roof back inner lower member 22 side, and the sash guide 6 is supported by the bolt 25.

The following is a description of the operation of the storage construction for the seat belt connecting member.

When the seat belt system is not in use, the tang 10 is attracted to the magnets 17 of the holding means 15, and the connector 7 is assembled to the connector holder 18. The connector 7 is assembled by hooking the hook-shaped engagement portion 7a to the protrusion 18d of the connector holder 18.

In order to assemble the engagement portion 7a of the connector 7, the connector 7 is turned sideways and is inserted in the space portion 19 above the protrusion 18d of the holder chamber 18b, by which the engagement portion 7a of the connector 7 is assembled so that the engagement portion 7a mates with the columnar protrusion 18d. Thus, the engagement portion 7a of the connector 7 is engaged with the protrusion 18d, and the back face of the connector 7 is locked by the internal wall surface 18c of the holder chamber 18b, so that the connector 7 is prevented from coming off from the connector holder 18.

When the seat belt system is used, the connector 7 is held by hand and is shifted to a position at which the protrusion 18d does not exist, and then the connector 7 is pulled out to the outside of the holder chamber 18b. Next, the tang 10 is separated from the magnets 17 of the holding means 15 and is pulled out, by which the seat belt 3 is pulled out of the retractor and is pulled out from the passenger's shoulder to one side of the center seat. Then, the connector 7 is fixed to the first fixing member 9, and the tang 10 is fixed to the second fixing member 11, by which the passenger is restrained.

As described above, according to the above-described embodiment of the present invention, the connector 7 and the tang 10 serving as a seat belt connecting member can be temporarily fixed and held without changing the seat belt system. Therefore, the cost can be reduced, and the appearance can be improved. Also, the connector holder 18 can be molded integrally with the attaching cover 12, and an intricate mold construction such as a slide mold is not needed. Therefore, this storage construction is very inexpensive and economical. Gravity and tension from the retractor are applied to the connector 7, so that there is no fear of looseness etc.

Figure 13:
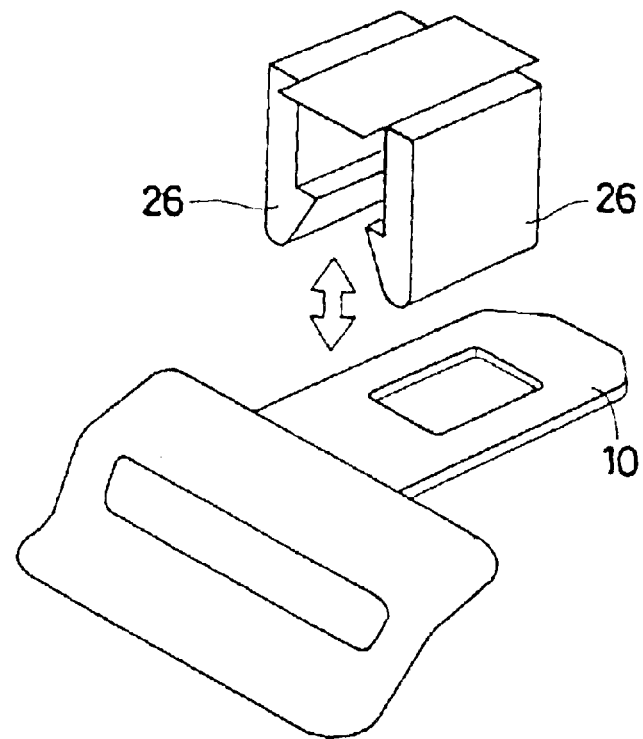
FIG. 13 is a perspective view showing a modification of holding means.
Figure 14:
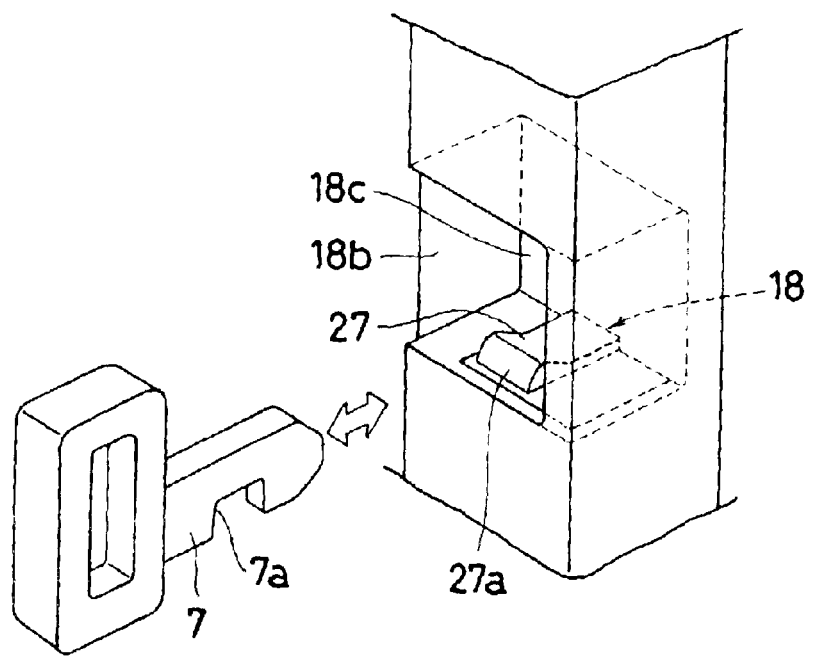
FIG. 14 is a perspective view showing a modification of a connector holder.
Figure 15:
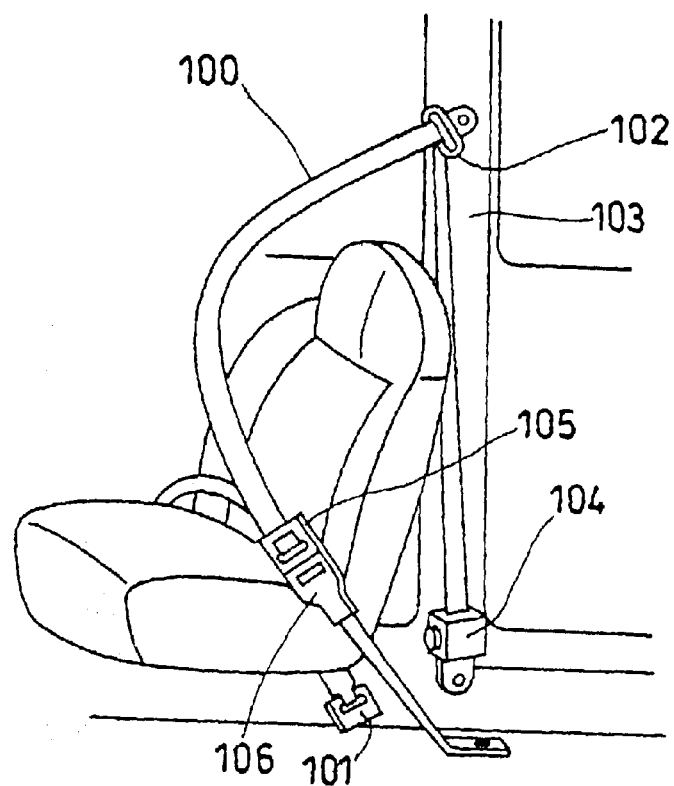
FIG. 15 is a perspective view showing a conventional three point seat belt system.
Figure 16:
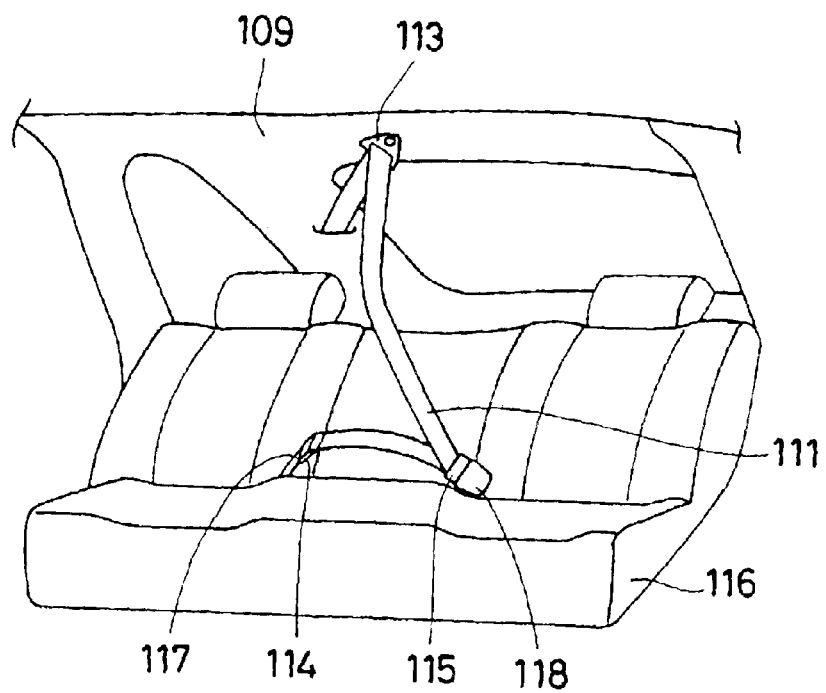
FIG. 16 is a perspective view showing a conventional three point seat belt system for a center seat.
Figure 17:
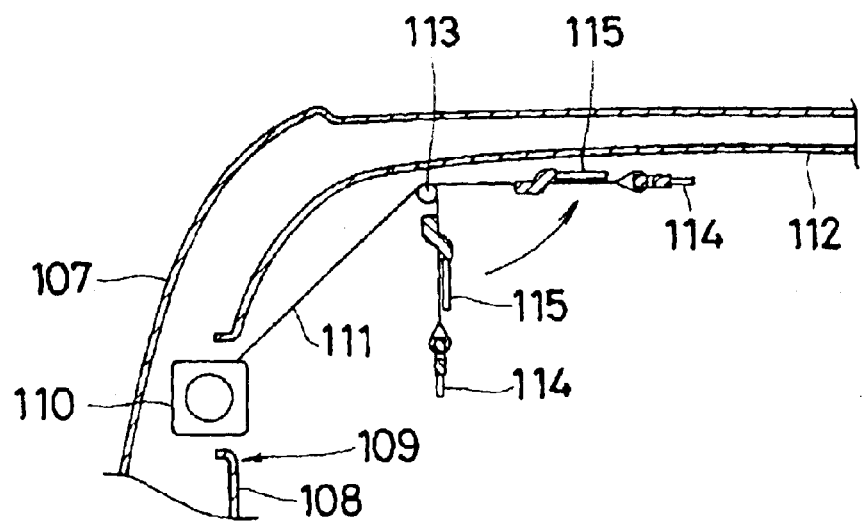
FIG. 17 is a sectional view showing a conventional three point seat belt system.
Figure 18:
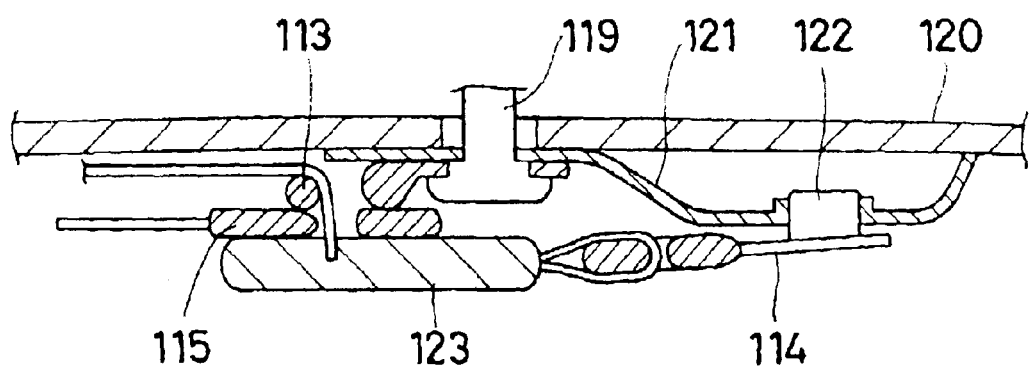
FIG. 18 is a sectional view showing one example of a conventional storage construction for a seat belt connecting member.
Figure 19:
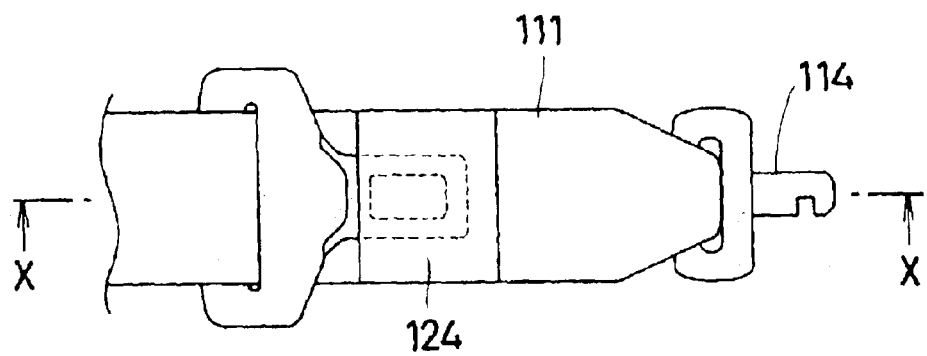
FIG. 19 is a sectional view showing another example of a conventional storage construction for a seat belt connecting member.
Figure 20:
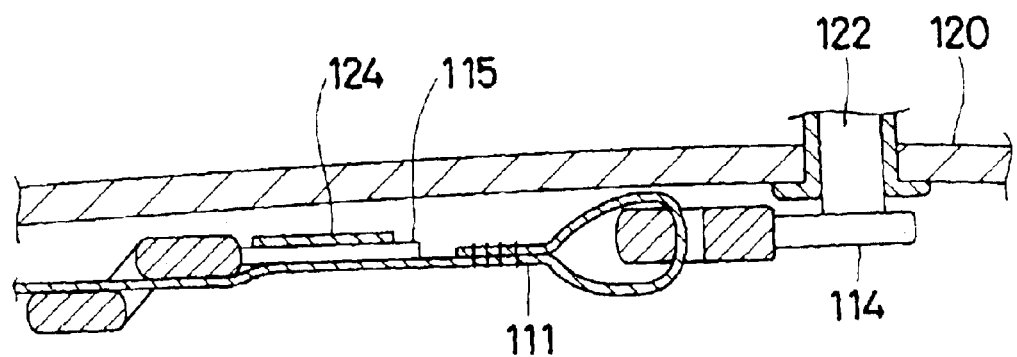
FIG. 20 is a sectional view taken along the line X—X of FIG. 19.

FIGS. 13 and 14 shows other embodiments of the present invention. In these figures, the same reference numerals are applied to the same elements as those in FIGS. 1 to 12, and the explanation of the same elements is omitted in the description below.

FIG. 13 shows a modification of the holding means 15. In this case, a pair of claws 26 opposed to each other are provided by molding integrally with the attaching cover 12 or by assembling to the attaching cover 12, by which both sides of the tang 10 are held by these paired claws 26.

FIG. 14 shows a modification of the connector holder 18. In this case, in place of the columnar protrusion 18d, a movable element 27 having a locking portion 27a for hooking the engagement portion 7a of the connector 7 is provided. The movable element 27 is formed so that one end thereof is connected to the internal wall surface 18c of the holder chamber 18b, and the other end thereof is separated from the wall surface so as to be a free end. In this modification, when the connector 7 is removed, the connector 7 is removed while pushing the movable element 27, by which the connector can be pulled out of the holder chamber 18b.

The present invention is not limited to the above-described embodiments. The material of the attaching cover 12 is not limited to a synthetic resin, and any material can be used. Also, although the attaching cover 12 is assembled to the roof lining 20 by using the claw portions 12c and the clip 13 in the above-described embodiments, screwing and other means can also be used to assemble the attaching cover 12. Besides, it is a matter of course that changes can be made appropriately without departing from the spirit and scope of the present invention.

As described above, according to the storage construction for the seat belt connecting member in the seat belt system in accordance with the present invention, the following effects can be achieved.

In a storage construction for a seat belt connecting member in a seat belt system in which a seat belt pulled out of a retractor provided on a vehicle body is pulled out in a slantwise downward direction via a sash guide mounted in a roof portion, a first connecting member mounted at the tip end of the seat belt is fixed to a first fixing member provided on the seat side, and a second connecting member provided in an intermediate portion of the seat belt is fixed to a second fixing member provided on the seat side, whereby a seat belt user is restrained by the seat belt set at three points, a connecting member attaching cover is provided in a sash guide attaching portion in the roof portion, and the connecting member attaching cover is provided with holding means for holding the first and second connecting members separately when the seat belt is not in use. Therefore, the seat belt itself need not be provided with fixing means, so that this storage construction is advantageous in terms of cost.

In the storage construction, a concave portion is provided on the lower surface side of the attaching cover, and holding means for holding the first and second connecting members separately when the seat belt is not in use is provided in the concave portion. Therefore, the seat belt connecting member does not protrude on the cabin side, so that the cabin space can be increased, and the appearance can be improved.

In the storage construction, holding means for holding the second connecting member by means of a magnetic force is provided in the concave portion of the attaching cover, and a holder which engages with the first connecting member to hold the first connecting member is provided in a side wall portion of the concave portion of the attaching cover. Therefore, the seat belt can be stored easily when it is not in use, and can be removed easily when it is used.

In the storage construction, a magnet is used as the holding means for holding the second connecting member by means of a magnetic force, and the magnet is assembled and fixed to a magnet attaching seat molded integrally with the attaching cover. Therefore, the second connecting member can be held easily.

In the storage construction, holding means which holds the second connecting member by holding the same between a pair of claw portions is provided in the concave portion of the attaching cover, and a connecting member holder which engages with the first connecting member to hold the first connecting member is provided in a side wall portion of the concave portion of the attaching cover. Therefore, the magnet is not needed, so that the cost can be reduced.

In the storage construction, an opening for inserting the first connecting member is formed in a side wall surface of the concave portion of the attaching cover as the connecting member holder, a holder chamber having a locking portion for hooking an engagement portion of the first connecting member is provided on the outside of the opening, and the holder chamber is formed so that the chamber width thereof is wider than the width of the first connecting member, but is narrower than the width of the first connecting member at the position of the locking portion. Therefore, the first connecting member can be held surely, and can be prevented from coming off from the locking portion.

In the storage construction, a space for allowing the first connecting member to pass through is provided above the locking portion, and the holder chamber is formed so that the upper end position of the locking portion is lower than the upper end of the opening. Therefore, the first connecting member can be assembled and removed easily.

In the storage construction, an opening for inserting the first connecting member is formed in a side wall surface of the concave portion of the attaching cover as the connecting member holder, a holding chamber is provided on the outside of the opening, and a movable element having a locking portion for hooking the engagement portion of the first connecting member is provided in the holder chamber. Therefore, the first connecting member can be inserted and pulled out easily and rapidly.

In the storage construction, an opening is formed in a roof lining of the roof portion, a plurality of claw portions which engage with the edge of the opening of the roof lining are formed at least on one side of the attaching cover and a clip attaching portion is formed on the other side of the attaching cover, and the claw portions are engaged with the edge of the opening of the roof lining and a clip mounted on the clip attaching portion is hooked to the roof lining, whereby the attaching cover is mounted in the roof portion. Therefore, the attaching portion of the roof lining and the attaching cover has no looseness, and the appearance can be improved.

What is claimed is:

1. A storage construction for a seat belt connecting member in a seat belt system in which a seat belt pulled out of a retractor provided on a vehicle body is pulled out in a slantwise direction via a sash guide mounted in a roof portion, comprising:

a first connecting member mounted at the tip end of said seat belt fixed to a first fixing member provided on a seat side, and a second connecting member provided in an intermediate portion of said seat belt fixed to a second fixing member provided on a seat side, whereby a seat belt user is restrained by said seat belt set at three points, and a connecting member attaching cover in a sash guide attaching portion in said roof portion, said attaching cover comprising a concave portion on a lower surface side thereof, wherein said concave portion comprises therein first and second holding means for holding said first and second connecting members separately when said seat belt is not in use, said second holding means comprising a pair of claw portions for holding said second connecting member therebetween and said first holding means comprising a connecting member holder for engaging with said first connecting member to hold said first connecting member and is provided in a side wall portion of said concave portion of said attaching cover.

2. The storage construction for a seat belt connecting member in a seat belt system according to claim 1, wherein a side wall surface of the concave portion of said attaching cover comprises an opening for inserting said first connecting member as said connecting member holder, said construction further comprising a holder chamber having a locking portion for hooking an engagement portion of said first connecting member on the outside of said opening, wherein said holder chamber is formed so that the chamber width thereof is wider than the width of said first connecting member at the position of said locking portion.

3. The storage construction for a seat belt connecting member in a seat belt system according to claim 1, further comprising a space for allowing said first connecting member to pass through above said locking portion, and wherein said holder chamber is formed so that the upper end position of said locking portion is lower than the upper end of said opening.

4. The storage construction for a seat belt connecting member in a seat belt system according to claim 1, wherein a side wall surface a the concave port on of said attaching cover comprises an opening for inserting said first connecting member as said connecting member holder, said construction further comprising a holding chamber on the outside of said opening, and a movable clement having a locking portion for hooking the engagement portion of said first connecting member in said holder chamber.

5. The storage construction for a seat belt connecting member in a seat belt system according to claim 1, comprising an opening formed in a roof lining of said roof portion, a plurality of claw portions which engage with the edge of the opening of said roof lining formed at least on one side of said attaching cover and a clip attaching portion formed on the other side of said attaching cover, wherein said claw portions are engaged with the edge of the opening of said roof lining and a clip mounted on said clip attaching portion is hooked to said roof lining, whereby said attaching cover is mounted in said roof portion.

6. A storage construction for a seat belt connecting member in a seat belt system in which a seat belt pulled out of a retractor provided on a vehicle body is pulled out in a slantwise direction via a sash guide mounted in a roof portion, comprising:

a first connecting member mounted at the tip end of said seat belt fixed to a first fixing member provided on a seat side, and a second connecting member provided in an intermediate portion of said seat belt fixed to a second fixing member provided on a seat side, whereby a seat belt user is restrained by said seat belt set at three points, and a connecting member attaching cover in a sash guide attaching portion in said roof portion, said attaching cover comprising a concave portion on a lower surface side thereof, wherein said concave portion comprises therein first and second holding means for holding said first and second connecting members separately when said seat belt is not in use, said first holding means comprising a holder for engaging with said first connecting member to hold said first connecting member and said second holding means comprising a magnet for holding said second connecting member by means of a magnetic force.

7. The storage construction for a seat belt connecting member in a seat belt system according to claim 6, wherein said magnet is assembled and fixed to a magnet attaching seat molded integrally with said attaching cover.

8. The storage construction for a seat belt connecting member in a seat belt system according to claim 6, wherein a side wall surface of the concave portion of said attaching cover comprises an opening for inserting said first connecting member as said connecting member holder, said construction further comprising a holder chamber having a locking portion for hooking an engagement portion of said first connecting member on the outside of said opening, wherein said holder chamber is formed so that the chamber width thereof is wider than the width of said first connecting member at the position of said locking portion.

9. The storage construction for a seat belt connecting member in a seat belt system according to claim 6, further comprising a space for allowing said first connecting member to pass through above said locking portion, and wherein said holder chamber is formed so that the upper end position of said locking portion is lower than the upper end of said opening.

10. The storage construction for a seat belt connecting member in a seat belt system according to claim 6, wherein a side wall surface of the concave portion of said attaching cover comprises an opening for inserting said first connecting member as said connecting member holder, said construction further comprising a holding chamber on the outside of said opening, and a movable element having a locking portion for hooking the engagement portion of said first connecting member in said holder chamber.

11. The storage construction for a seat belt connecting member in a seat belt system according to claim 6, comprising an opening formed in a roof lining of said roof portion, a plurality of claw portions which engage with the edge of the opening of said roof lining formed at least on one side of said attaching cover and a clip attaching portion formed on the other side of said attaching cover, wherein said claw portions are engaged with the edge of the opening of said roof lining and a clip mounted on said clip attaching portion is hooked to said roof lining, whereby said attaching cover is mounted in said roof portion.

* * * * *